(12) United States Patent
Motazedi (10) Patent No.: US 11,884,248 B2
(45) Date of Patent: Jan. 30, 2024

(54) PORTABLE TRAIN CAR BRAKING UNIT

(71) Applicant: Accenture Global Solutions Limited, Dublin (IE)

(72) Inventor: Eric Motazedi, Centennial, CO (US)

(73) Assignee: Accenture Global Solutions Limited, Dublin (IE)

( * ) Notice: Subject to any disclaimer, the term of this patent is extended or adjusted under 35 U.S.C. 154(b) by 562 days.

(21) Appl. No.: 17/030,823

(22) Filed: Sep. 24, 2020

(65) Prior Publication Data

US 2021/0094525 A1 Apr. 1, 2021

Related U.S. Application Data

(60) Provisional application No. 62/908,982, filed on Oct. 1, 2019.

(51) Int. Cl.
| | |
|---|---|
| *G05D 1/00* | (2006.01) |
| *B60T 13/66* | (2006.01) |
| *B60T 8/17* | (2006.01) |
| *B60T 17/22* | (2006.01) |
| *B60T 13/68* | (2006.01) |

(52) U.S. Cl.
CPC .......... *B60T 13/665* (2013.01); *B60T 8/1705* (2013.01); *B60T 13/683* (2013.01); *B60T 17/228* (2013.01)

(58) Field of Classification Search
CPC .... B60T 13/665; B60T 8/1705; B60T 13/683; B60T 17/228
See application file for complete search history.

(56) References Cited

U.S. PATENT DOCUMENTS

| | | |
|---|---|---|
| 5,429,329 A | 7/1995 | Wallace et al. |
| 7,200,471 B2 | 4/2007 | Kane et al. |
| 11,230,410 B2 | 1/2022 | Brunner |
| 2008/0189000 A1 | 8/2008 | Duong |
| 2022/0089202 A1* | 3/2022 | Gorman .............. B61L 15/0081 |

FOREIGN PATENT DOCUMENTS

| | | | |
|---|---|---|---|
| AU | 2018375539 A1 * | 5/2020 | ............ B60T 13/365 |
| CN | 206797358 | 12/2017 | |
| CN | 111731247 A * | 10/2020 | |

OTHER PUBLICATIONS

CA Office Action in Canadian Appln. No. 3,094,991, dated Nov. 29, 2021, 9 pages.

* cited by examiner

*Primary Examiner* — Adam M Alharbi
(74) *Attorney, Agent, or Firm* — Fish & Richardson P.C.

(57) ABSTRACT

A mobile unit that includes a compressed gas canister, a brake hose coupled to the compressed gas canister, a radar, and a processor and a storage device. The storage device stores instructions that are operable, when executed by the processor, to cause the processor to perform operations of obtaining radar data from the radar, determining, based on the radar data, a distance of the mobile unit to an object, determining that the distance of the mobile unit to the object satisfies a braking criteria, and based on determining that the distance of the mobile unit to the object satisfies the braking criteria, releasing gas from the compressed gas canister through the brake hose coupled to the compressed gas canister and into the brake pipe of a train car.

20 Claims, 7 Drawing Sheets

PORTABLE TRAIN CAR BRAKING UNIT

CROSS-REFERENCE TO RELATED APPLICATION

This application claims the benefit of U.S. Provisional Application No. 62/908,982, filed on Oct. 1, 2019, the contents of which are incorporated by reference herein.

TECHNICAL FIELD

This disclosure generally relates to controlling trains.

BACKGROUND

Human train engineers drive trains on rail tracks. The engineers may manipulate controls in a train engine, also referred to as locomotive, to control a speed and direction of the train. For example, the human train engineer may manipulate a throttle to control a speed of a train, a reverser to control a direction of travel between forward or reverse, and a brake to control deceleration or immobilize the train. Additionally, train cars may be uncontrolled while they roll towards each other to be coupled. These uncontrolled moving train cars frequently injure or kill train yard workers.

SUMMARY

In general, an aspect of the subject matter described in this specification may involve a process for providing rail support. The rail support platform receives data from different types of sensors and automatically provides support based on the data that was sensed. For example, the rail support platform may warn a train engineer about obstacles that the train is approaching or issues with a rail track. In another example, the rail support platform may directly control movement of the train by controlling throttling and braking of the train. In another example, the rail support platform may control braking of train cars that are moving to be coupled while not attached to train engines.

In some aspects, the subject matter described in this specification may be embodied in methods that may include the actions of obtaining radar data from a radar, determining, based on the radar data, a distance of a mobile unit to an object, determining that the distance of the mobile unit to the object satisfies a braking criteria, and based on determining that the distance of the mobile unit to the object satisfies the braking criteria, releasing gas from a compressed gas canister through a brake hose coupled to the compressed gas canister and into a brake pipe of a train car.

Other versions include corresponding systems, apparatus, and computer programs, configured to perform the actions of the methods, encoded on computer storage devices.

These and other versions may each optionally include one or more of the following features. For instance, in some implementations determining that the distance of the mobile unit to the object satisfies a braking criteria includes determining a non-zero pound-force per square inch (psi) to create in the brake pipe based on the distance of the mobile unit to the object. In certain aspects, determining that the distance of the mobile unit to the object satisfies a braking criteria includes determining a speed of the mobile unit based on the radar data, determining, based on the distance of the mobile unit to the object and the speed of the mobile unit, that the mobile unit will not stop within a coupling distance threshold from the object without hitting the object, and based on determining that the mobile unit will not stop within the coupling distance threshold from the object without hitting the object, determining to apply brakes of the train car.

In some aspects, releasing gas from the compressed gas canister through the brake hose coupled to the compressed gas canister and into the brake pipe of a train car applies brakes of the train car to wheels of the train car. In some implementations, actions include obtaining an image from a non-thermographic camera, where the object is a second train car, and determining the distance of the mobile unit to the second train car is based on the image and the radar data. In certain aspects, actions include obtaining an infrared image from a thermographic camera, where the object is a human, and determining the distance of the mobile unit to the human is based on the infrared image and the radar data.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

FIGS. 1A-1D illustrate diagrams of an exemplary system 100 for providing rail support. The system 100 is used here in the context of alerting an engineer or adjusting a train engine, in other implementations in which no train engine is attached, train car braking is controlled directly. The system 100 includes an engine unit 112 that's included in a train engine 110, a first mobile unit 122 that is coupled to a first car 120, and a second mobile unit 132 that is coupled to a second car 130.

The engine unit 112 includes a radar that faces towards a front of the train and detects objects in front of the train, a processor that processes data received from sensors including the radar and controls the train based on the processing, and an engine control unit, e.g., a bus that interfaces with a throttle and brake of the train engine. For example, the processor may receive radar data from the radar, process the radar data and determine the train should stop as it is approaching an obstacle on the rail track, and use an engine control unit, e.g., the bus, to brake the train.

The radar of the engine unit 112 may operate at 78.5 Gigahertz (GHz) or at some other frequency. The engine unit 112 may be powered by the train engine 110. The engine unit 112 may also include a transmitter that communicates with a portable support device carried by a train engineer that drives the train. The portable support device may include a speaker that provides audible sounds to the train engineer. For example, the portable support device may provide an audible warning of "Warning, the train is approaching an object on the rail track. Please consider stopping the train."

The mobile units coupled to the cars may each include a radar to detect objects, and a transmitter to transmit radar data generated from the radar to the engine unit 112. The mobile units may be detachable from the cars. For example, the first mobile unit 122 may include a permanent magnet such that the first mobile unit 122 can be coupled to a ferromagnetic portion of the first car 120, held in place by magnetism, and removed with external force that pulls the first mobile unit 122 from the ferromagnetic portion of the first car 120. In some implementations, the mobile units and the engine unit may form an ad-hoc mesh network to provide for communications between one another. The mobile units may be battery-powered.

Figure 1A:
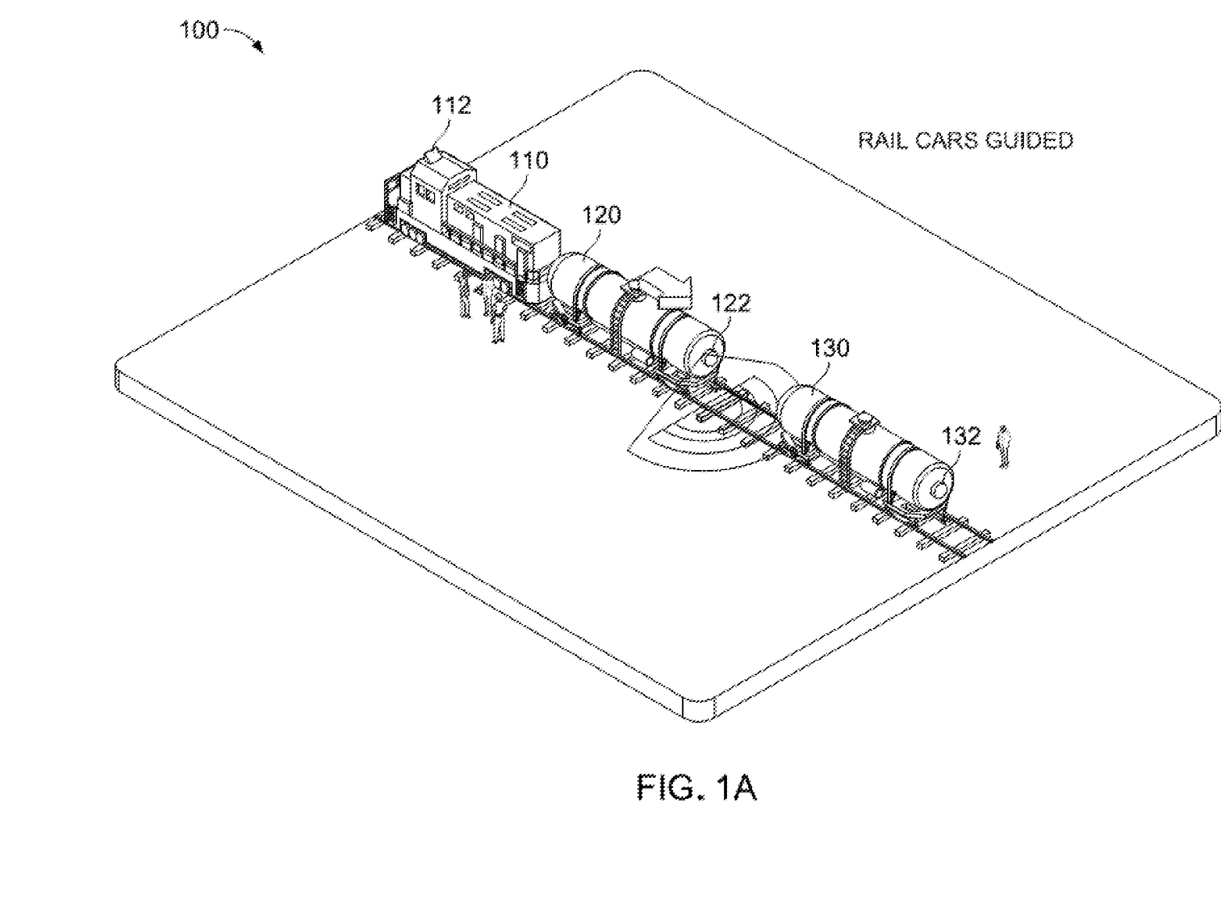
FIGS. 1A-1D illustrate diagrams of an exemplary system for providing rail support.

FIG. 1A illustrates a diagram of the system 100 where the rail cars are guided. During a car coupling process, the train is reversed until the end of the train is at a suitable distance for the coupling mechanism at the end of the train to couple to a coupling mechanism at the front of the car to be coupled to the train. For example, as shown in FIG. 1A, the first car 120 has already been coupled to the train engine 110, and the train engine 110 is reversing the train, formed of the train engine 110 and the first car 120, towards the second car 130 that is not yet coupled to the train.

The first mobile unit 122 is attached to the back of the first car 120 such that the radar receives radar signals reflected off the front of the second car 130. The first mobile unit 122 may provide the radar signals to the engine unit 112 and the engine unit 112 may then determine the distance from the first mobile unit 122 to the front of the second car 130. In another example, the first mobile unit 122 may determine the distance from the first mobile unit 122 and then provide data that indicates the distance to the engine unit 112. The distance may be determined from detected radar signals with a digital signal processor. For example, the digital signal processor may use Fourier transforms and other mathematical operations to determine distances.

For the car coupling process, the first mobile unit 122 may be initially attached to a back of the train engine 110 and the engine unit 112 may receive an instruction that car coupling is to be performed. In response, the engine unit 112 may determine a distance from the first mobile unit 122 to a front of the first car 120, determine, based on the radar signals received from the first mobile unit 122, that the distance is greater than a coupling distance threshold, and, in response, control the train engine 110 to move towards the first car 120.

The engine unit 112 may continue to monitor the distance and control the speed of the train engine 110 so that the train engine stops at the coupling distance threshold. The engine unit 112 may then brake the train and, if possible, instruct the last car coupled to the train to couple with the car that is not yet coupled to the train. Otherwise, a person may then manually couple the last car to the car to be coupled.

If coupling another car, a person may then remove the first mobile unit 122 from the train engine, and attach the first mobile unit 122 to the back of the car that was just coupled to the end of the train. The engine unit 112 may then receive another instruction to couple another car and repeat the process. The process may be repeated for any number of cars.

Figure 1B:
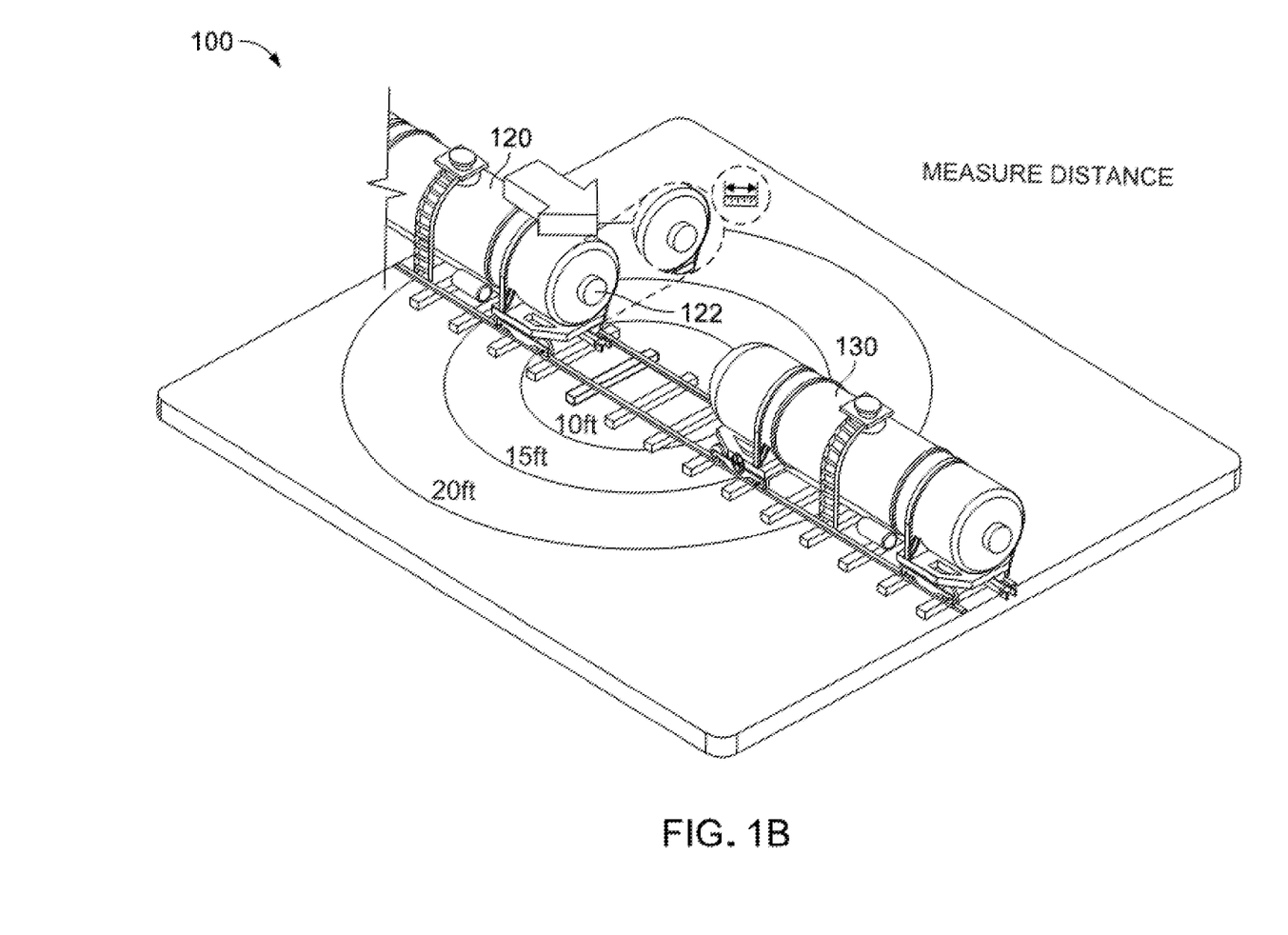

FIG. 1B illustrates a diagram of the system 100 where a distance is measured. As shown, the first mobile unit 122 may determine from reflected radar signals that the distance between the first mobile unit 122 to the second car 130 is ten feet. The first mobile unit 122 may also determine the distance of other objects. For example, the first mobile unit 122 may determine that an object to the side of the second car 10 is fifteen feet, twenty feet, or some other distance away.

Figure 1C:
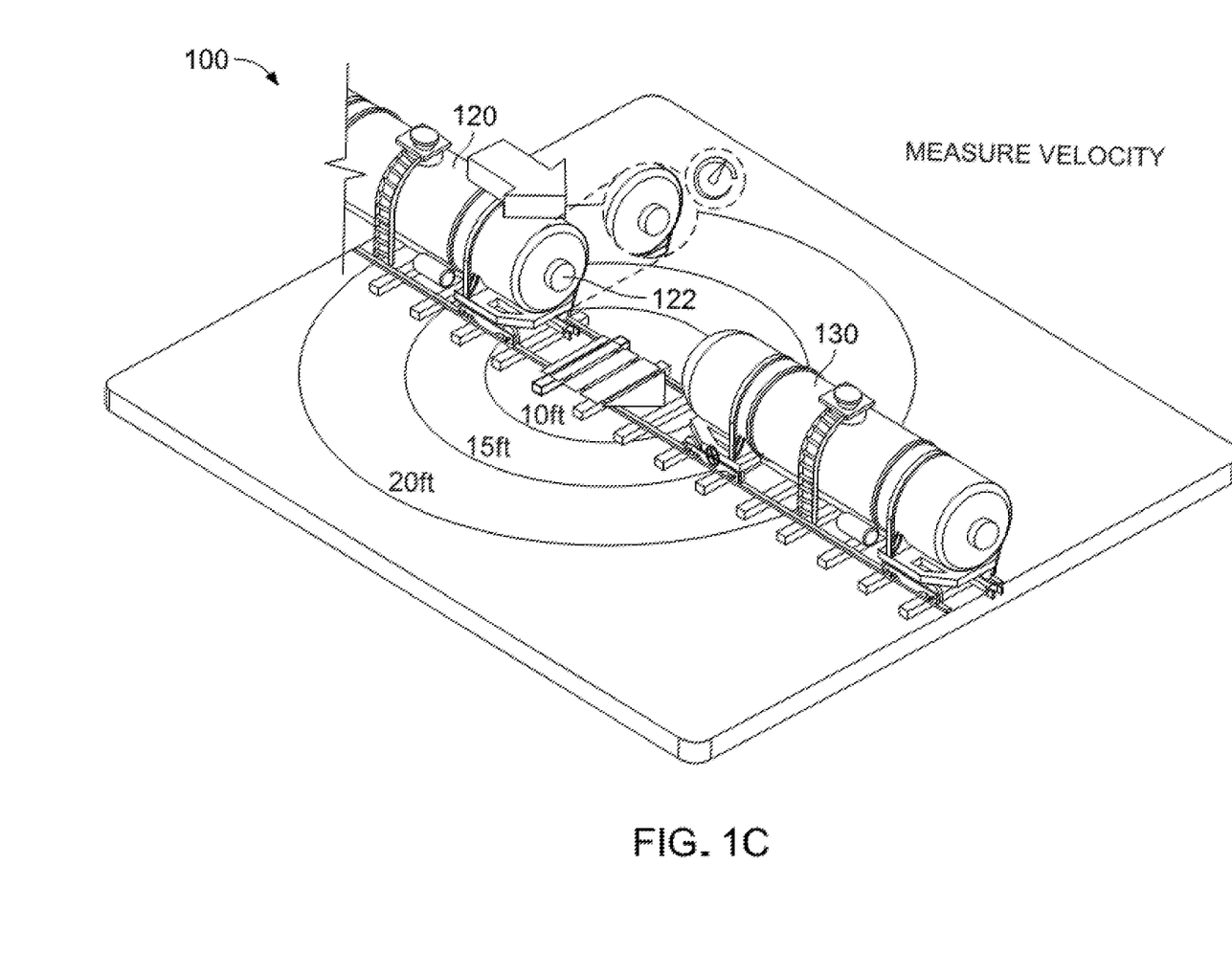

FIG. 1C illustrates a diagram of the system 100 where a velocity is measured. As shown, the first mobile unit 122 may determine a velocity of the train from an amount of decrease in distance to the second car 130 during a measured amount of time. In another example, the first mobile unit 122 may include a camera and determine a velocity of the train based on a measured amount of time and, during the measured amount of time, a distance traveled determined from images captured by the camera.

Figure 1D:
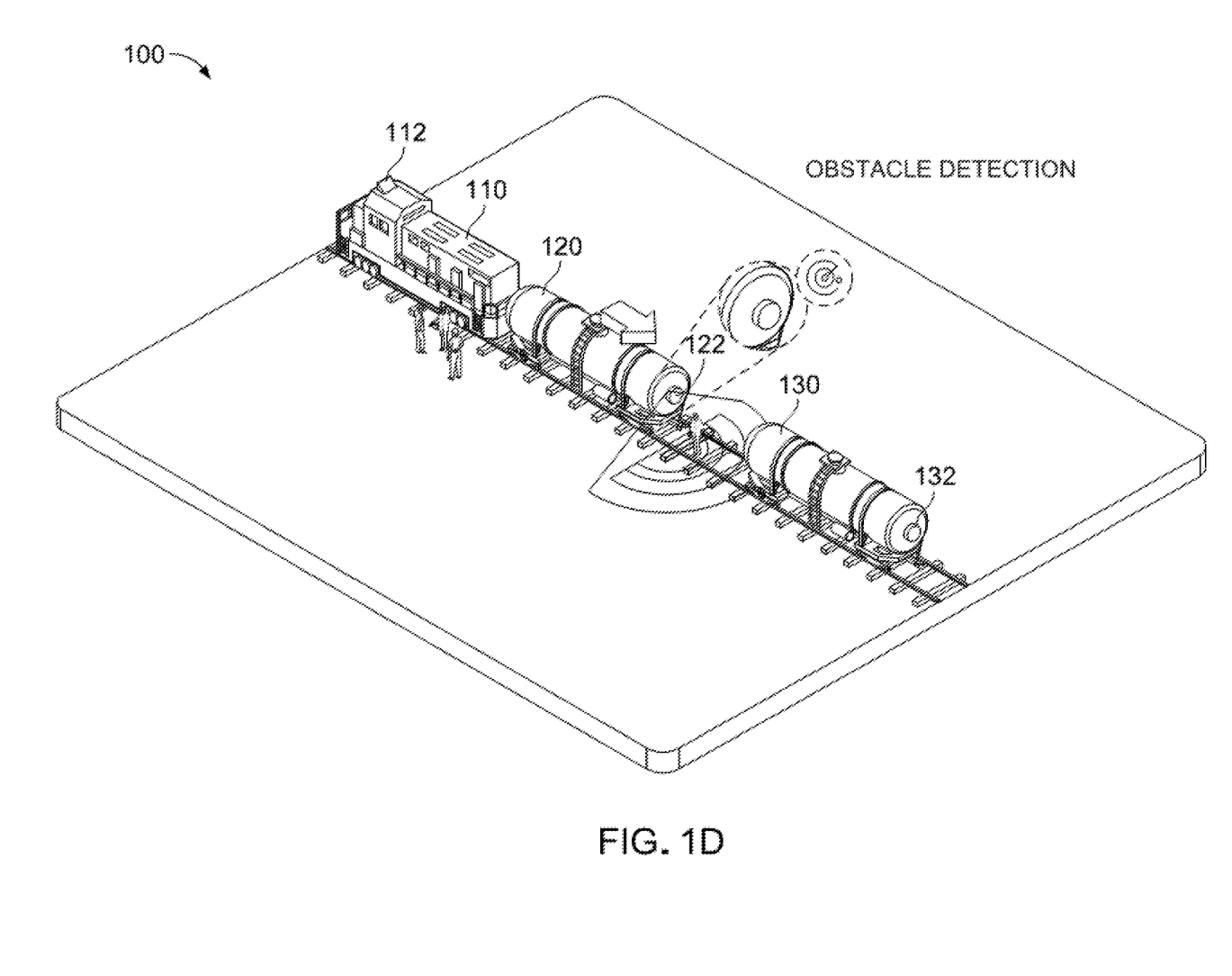

FIG. 1D illustrates a diagram of the system 100 where an obstacle is detected. As shown, a human is between the back of the first car 120 and the front of the second car 130. The engine unit 112 may receive radar data from the first mobile unit 122 and determine from the radar data that a human shaped object is between the first car 120 and the second car 130. In response to detecting the human shaped object, the engine unit 112 may stop the train.

In some implementations, providing rail support includes a process that includes obtaining radar data from a radar, determining a distance of a train to an object based on the radar data, determining that the distance of the train to the object satisfies a warning distance threshold, in response to determining that the distance of the train to the object satisfies the warning distance threshold, providing an alert to a train engineer that is driving the train, determining that the distance of the train to the object satisfies a terminal distance threshold that is less than the warning distance threshold, in response to determining that the distance of the train to the object satisfies the terminal distance threshold that is less than the warning distance threshold, reducing a speed of the train.

For example, the engine unit 112 may perform the actions of obtaining radar data from a radar in the first mobile unit 122 where the radar data represents detected signals reflected off a human, determining from the radar that that the train is fifty feet from the human, determining that the distance of fifty feet satisfying a warning distance threshold of less than sixty feet, and, in response, providing warning of "Warning, a person may be in the path of the train" to a train engineer. If the train engineer does not stop the train, the engine unit 112 may continue by performing the actions of determining a distance of the first mobile unit 122 to the human is now twenty feet, determining that the distance of the train to the object of twenty feet satisfies a warning distance threshold of less than thirty feet, and, in response, stop a throttle and engage the brakes so that the train does not hit the human.

In some implementations, the engine unit 112 may determine whether an obstacle is a human or animal based on sensor data from a thermographic camera. For example, the engine unit 112 may determine that an obstacle detected from the radar data is in a location that corresponds to a warm heat signature detected by the thermographic camera and, in response, determine that the obstacle is a human or animal so the train should avoid hitting the obstacle.

In some implementations, the engine unit 112 may perform obstacle detection also using images captured by a visible light camera. For example, the engine unit 112 may detect that the train is approaching a snow bank using images captured by a visible light camera and, in response, alert a train engineer after a warning distance threshold is reached and stop the train after a terminal distance threshold is reached. In some implementations, the engine unit 112 may perform obstacle detection with a combination of radar data and images, and may also determine whether an obstacle is moving parallel to the train or whether the obstacle with be in the path of the train. The engine unit 112 may ignore obstacles moving parallel to the train and provide warnings and stop the train as described above for obstacles that are in or moving into the path of the train.

In some implementations, the engine unit 112 may monitor rail track integrity. For example, the engine unit 112 may receive sensor data in the form of images captured by a visible light camera and radar data generated by a front facing camera. In the example, the engine unit 112 may determine from one or more of the visible light camera or the radar data whether there are any issues with the rail track, e.g., a portion of the rail track is destroyed, and, in response to determining there is an issue, provide a warning and stop the train based on distances from the potential issue with the rail track.

In some implementations, the engine unit 112 may perform junction integrity. For example, the engine unit 112 may determine whether a rail track has been completely affixed to a direction of the rail track and that there is no alignment problem between rail tracks. If there is a junction integrity problem, the engine unit 112 may provide a warning and stop the train based on distance from the problem. In some implementations, solar powered devices may also be positioned at junctions, determine whether junctions are fully connected based on whether contacts on the tracks are fully in contact, and provide signals that indicate that a junction is fully connected. The engine unit 112 may receive the signals, and provide warning and stop the train when the signals don't indicate that the junction that the train is approaching is fully connected.

In some implementations, the system 100 may enable a train engineer to override the system 100. For example, the system 100 may store privilege settings that indicate whether the train engineer can instruct the engine unit 112 to not stop when there is an issue and a terminal distance threshold is satisfied.

Figure 2:
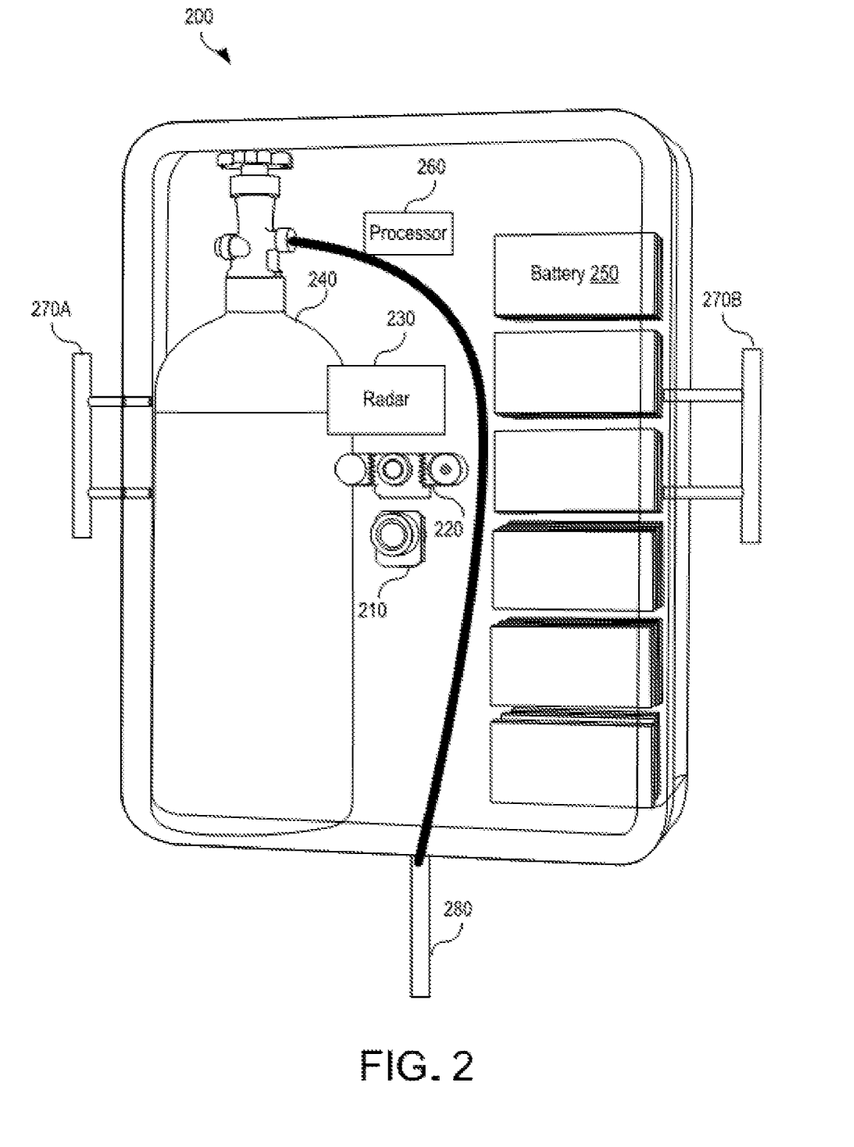
FIG. 2 illustrates a schematic diagram of an example mobile unit.

FIG. 2 illustrates a schematic diagram of an example mobile unit 200. In some implementations, a train engine may not be coupled to a car and therefore may not control the speed that the car moves towards another car. Instead, the car may be pushed and may then roll down tracks by momentum until brakes on the car are applied to stop the car. When the mobile unit 200 detects that a first car is close to a second car or the first car is close to a human, the mobile unit 200 may release compressed gas into a brake pipe, also referred to as a train line, of the first car. The increased air pressure in the brake pipe may apply brakes of the first car.

Similarly to as described above for mobile unit 122, the mobile unit 200 may be attached to an end of a first car by a human. The first car may then be moved, e.g., by a hydraulic powered device that pushes the first car or a train engine temporarily pushing against the first car. The first car may then roll towards a second car by momentum, and the mobile unit 200 may then brake the first car at an appropriate time such that the first car stops within a coupling distance threshold from the second car. The second car may then be coupled to the first car, and the human may then remove the mobile unit 200 from the first car and attach the mobile unit 200 to the end of the second car and repeat until all couplings between cars are completed.

The mobile unit 200 include a housing that encloses a thermographic camera 210, a non-thermographic camera 220, a radar 230, a compressed gas canister 240, a battery 250, a processor 260, two handles 270A, 270B (collectively referred to as 270), and a brake hose 280. However, other mobile units may include fewer or additional sensors. For example, a mobile unit may include only a single sensor that is the non-thermographic camera 220, or may not include the non-thermographic camera 220, or may additionally include a lidar unit and/or a sonar unit.

The thermographic camera 210 may capture images that represent detected infrared light from objects. For example, the thermographic camera 210 may generate an image that shows a human as a human sized heat source. In another example, the thermographic camera 210 may generate an image that shows a metal human-shaped object as a non-heat source.

The thermographic camera 210, the non-thermographic camera 220, and the radar 230 may be positioned in a center area of the mobile unit 200, and the gas canister 240 and the battery 250 may be positioned on two opposite sides of the mobile unit 200 near respective ones of the two handles 270. Accordingly, the weight of the gas canister 240 and the battery 250 may be distributed near the handles 270 so that that mobile unit 200 is easier to hold by the handles 270.

The battery 250 may be one of multiple batteries that form an array of batteries. The battery 250 may provide power to the other components of the mobile unit 200. For example, the battery 250 may be electrically coupled to and provide power to the thermographic camera 210, the camera 220, the radar, and the processor 260.

The compressed gas canister 240 may store compressed gas and include a valve that controls the pressure of gas output from the canister 240. For example, the canister 240 may release gas at a controllable pressure between zero to ninety pound force per square inch (psi). The canister 240 may be connected to the brake hose 280, and gas output by the canister 240 may flow through brake hose 280.

The brake hose 280 may be coupled to the brake pipe of the car to which the mobile unit 200 is attached so that gas released from the canister 240 increases air pressure in the brake pipe. Each time the mobile unit 200 is attached to a car the brake hose 280 may also be coupled to a brake pipe of the car, and each time the mobile unit 200 is removed from a car the brake hose 280 may also be decoupled from the brake pipe of the car.

The processor 260 may perform processing that is described above as being performed by the engine unit 112. For example, the processor 260 may (i) receive infrared images from the thermographic camera, red-green-blue (RGB) images from the camera 220, and radar signals from the radar 230, (ii) detect an object that the mobile unit 200 is approaching based on the infrared images, the RGB images, and the radar signals, (iii) determine, based on the infrared images, the RGB images, and the radar signals, a speed of the mobile unit 200 and a distance of the mobile unit 200 from the object, and (iv) based on the speed and distance, determine to release gas out of the canister 240 to brake a car.

The processor 260 may continuously determine a psi to create in the brake pipe based on a distance and speed from objects. For example, the processor 260 may start braking with twenty psi and keep the psi constant such that the train car stops within a coupling distance threshold of a second car. In another example, the processor 260 may start with twenty psi, then after a few seconds determine that the train car won't stop before hitting the second car unless braking is increased, and, in response, increase a psi to thirty. In yet another example, resuming from the prior example, the processor 260 may determine after a few more seconds that the train car will stop too far from the second car outside of a coupling distance threshold and, in response, reduce psi from thirty to twenty five.

Figure 3:
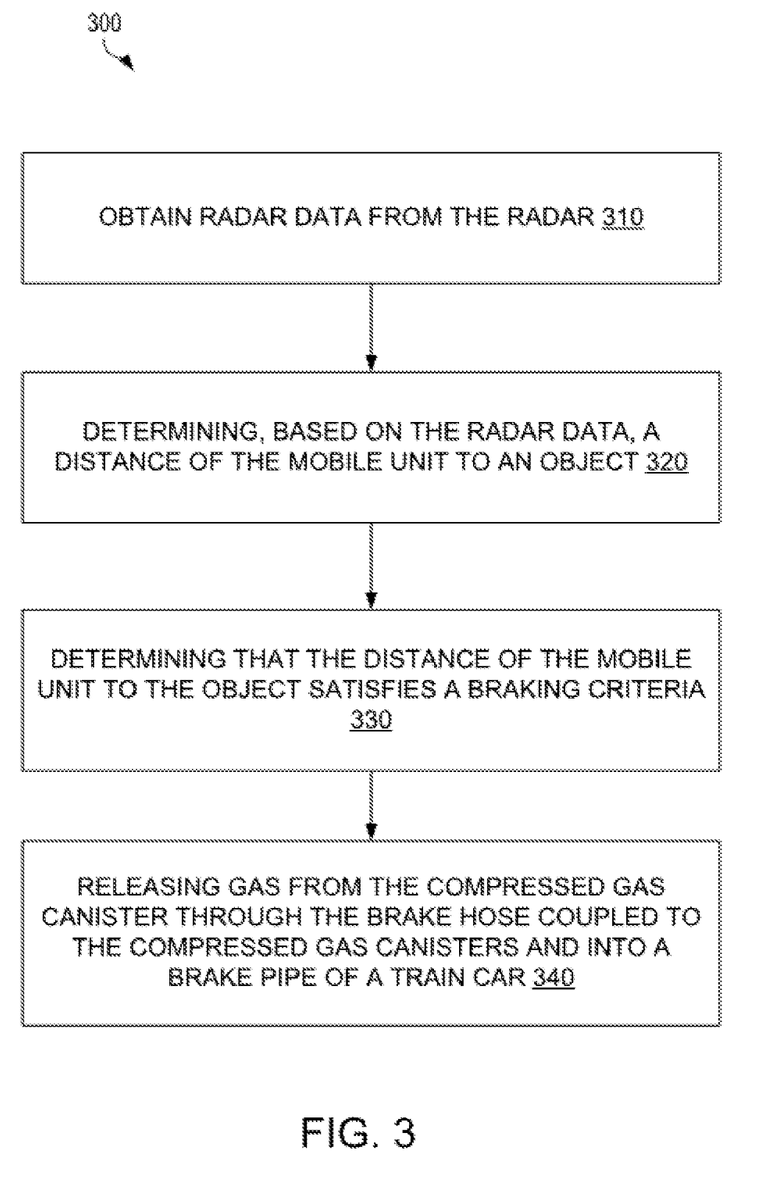
FIG. 3 illustrates a flow diagram of an example process performed by a mobile unit.

FIG. 3 illustrates a flow diagram of an example process 300 performed by a mobile unit. For example, the process 300 may be performed by the processor 260 of the mobile unit 200.

The process 300 includes obtaining radar data from the radar (310). For example, the processor 260 may obtain radar data from the radar 230, where the radar data represents detected reflections of radar signals emitted by the radar 230, and the radar signals are reflected off a train car.

The process 300 includes determining, based on the radar data, a distance of the mobile unit to an object (320). For example, the processor 260 may determine, based on a timing between when radar signals were emitted by the radar 230 and reflected radar signals were detected by the radar 230, that the radar 230 is twenty feet from the train car.

The process 300 includes determining that the distance of the mobile unit to the object satisfies a braking criteria (330). For example, the processor 260 may determine that the distance of twenty feet from the train car satisfies a braking criteria of twenty feet or less from the train car. In another example, the processor 260 may determine that the distance of fifteen feet from the train car to a human satisfies a braking criteria of thirty feet or less from the train car. In yet another example, the processor 260 may determine that the distance of twenty feet from the train car satisfies a braking criteria of determining the mobile unit 200 will hit the object before stopping.

In some implementations, determining that the distance of the mobile unit to the object satisfies a braking criteria includes determining a non-zero psi to create in the brake pipe based on the distance of the mobile unit to the object. For example, in response to a train car detected twenty feet away, the processor 260 may determine to start slowly braking by increasing a psi to twenty. In another example, in response to a human detected ten feet away, the processor 260 may determine to emergency brake and increase a psi to ninety. In yet another example, in response to a human detected thirty feet away, the processor 260 may determine to start slowly braking by increasing a psi to twenty.

In some implementations, determining that the distance of the mobile unit to the object satisfies a braking criteria includes determining a speed of the mobile unit based on the radar data, determining, based on the distance of the mobile unit to the object and the speed of the mobile unit, that the mobile unit will not stop within a coupling distance threshold from the object without hitting the object, and based on determining that the mobile unit will not stop within the coupling distance threshold from the object without hitting the object, determining to apply brakes of the train car. For example, the processor 260 may determine that the mobile unit 200 is moving at ten miles per hour and is twenty feet from a car, determine that the mobile unit 200 will not stop within one feet of the train car without hitting the train car, and, in response, determine to begin braking.

The process 300 includes, based on determining that the distance of the mobile unit to the object satisfies the braking criteria, releasing gas from the compressed gas canister through the brake hose coupled to the compressed gas canister and into a brake pipe of a train car (340). For example, the processor 260 may open a valve of the canister 240 and gas from the canister 240 may flow through the brake hose 280 and increase pressure in a brake pipe. In some implementations, releasing gas from the compressed gas canister through the brake hose coupled to the compressed gas canister and into the brake pipe of a train car applies brakes of the train car to wheels of the train car.

In some implementations, the mobile unit is attached to a side of the train car that is closest towards the object. For example, the mobile unit 200 may be attached to the side of the first train car 120 where the mobile unit 122 is shown as being attached, and the first train car 120 may then be moved towards the second train car 130.

In some implementations, the mobile unit includes a permanent magnet on a side of the mobile unit that is opposite of the side of the mobile unit where the radar is positioned, where the mobile unit is removably attached to the train car by the permanent magnet. For example, the mobile unit 200 may include the radar 230 on a front side and a permanent magnet on a back side of the mobile unit 200, where the permanent magnet is strong enough that the mobile unit 200 stays attached to a train car but not so strong as the mobile unit 200 is not removable by a single human without tools.

In some implementations, the mobile unit includes a non-thermographic camera, where the storage device stores instructions that are operable, when executed by the processor, to cause the processor to perform operations of obtaining an image from the non-thermographic camera, where the object is a second train car, and determining the distance of the mobile unit to the second train car is based on the image and the radar data. For example, the processor 260 may receive radar data from the radar 230 and a RGB image from the non-thermographic camera 220, and determine from the radar data and the RGB image that a train car is twenty feet away.

In some implementations, the mobile unit includes an thermographic camera, where the storage device stores instructions that are operable, when executed by the processor, to cause the processor to perform operations of obtaining an infrared image from the thermographic camera, where the object is a human, and determining the distance of the mobile unit to the human is based on the infrared image and the radar data. For example, the processor 260 may receive radar data from the radar 230 and an infrared image from the thermographic camera 210, and determine from the radar data and the infrared image that a human is ten feet away.

Figure 4:
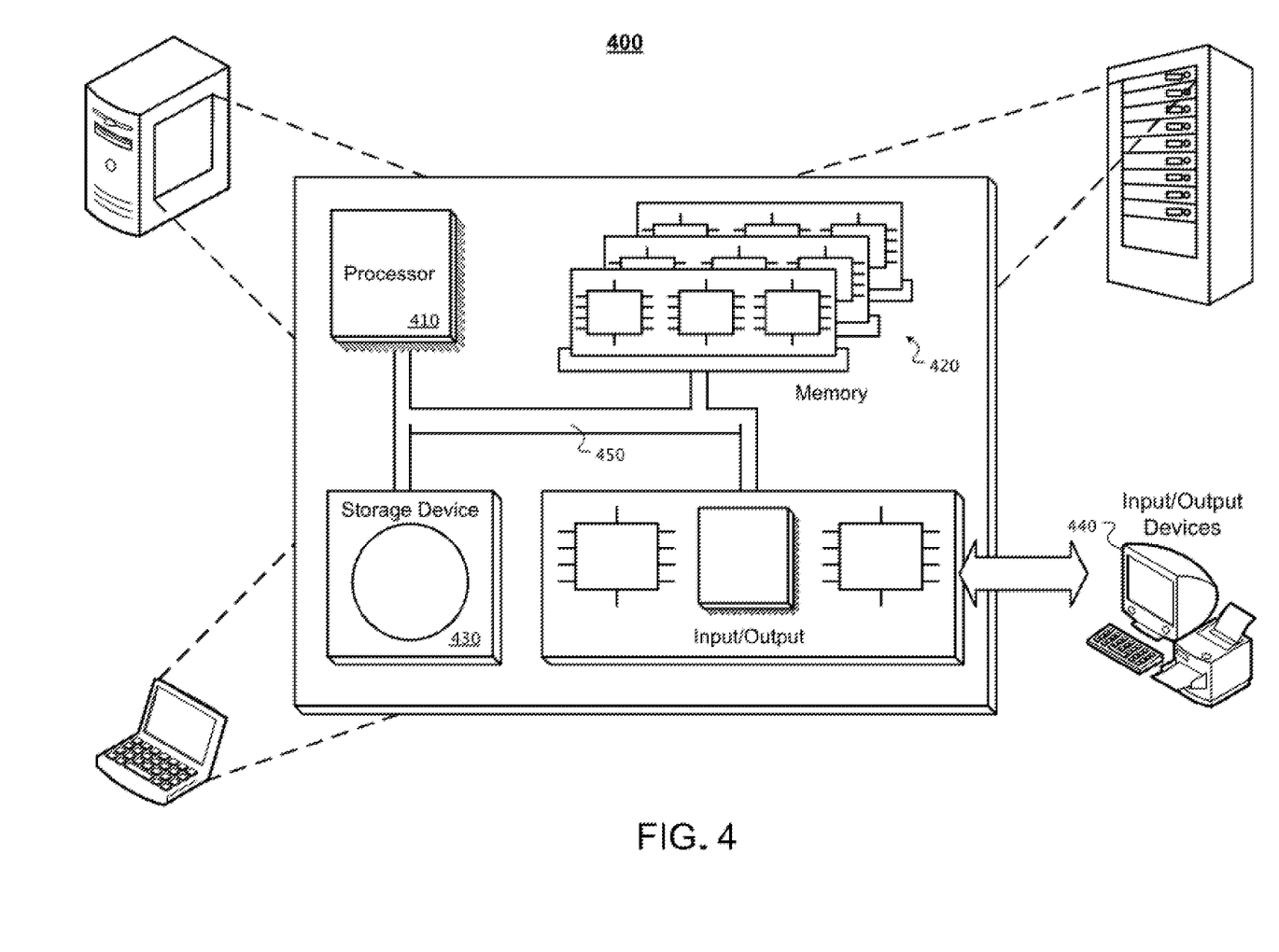
FIG. 4 illustrates a schematic diagram of an exemplary generic computer system.

FIG. 4 illustrates a schematic diagram of an exemplary generic computer system. The system 400 may be included in the system 100, such as in the engine unit 112.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, a solid state drive, an optical disk device, a tape device, universal serial bus stick, or some other storage device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a rail trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A detachable, portable train car braking unit for directly controlling a brake of a train car to which it is attached, the detachable, portable train car braking unit comprising:
   a housing;
   an attachment device for detachably attaching the housing of the detachable, portable train car braking unit to a train car;
   a compressed gas canister located within the housing of the detachable, portable train car braking unit;
   a brake hose coupled to the compressed gas canister and extending out from the housing of the detachable, portable train car braking unit, an end of the brake hose outside of the housing including a detachable coupler for coupling the brake hose to a brake pipe of the train car to which it is attached;
   a radar at least partially within the housing of the detachable, portable train car braking unit, the radar including a radar emitter located on an exterior of the housing of the detachable, portable train car braking unit; and
   a processor and a storage device located within the housing and storing instructions that are operable, when executed by the processor, to cause the processor to perform operations of:
      obtaining radar data from the radar;
      determining, based on the radar data, a distance of the radar emitter of the detachable, portable train car braking unit to an object;
      determining that the distance of the radar emitter of the detachable, portable train car braking unit to the object satisfies a braking criteria; and
      based on determining that the distance of the detachable, portable train car braking unit to the object satisfies the braking criteria, directly controlling a brake of the train car to which the detachable, portable train car braking unit is attached, comprising releasing gas from the compressed gas canister located within the housing of the detachable, portable train car braking unit, through the brake hose that extends out from the housing of the detachable, portable train car braking unit, through the detachable coupler between the brake hose and the brake pipe of the train car to which the detachable, portable train car braking unit is attached, and into the brake pipe of the train car to which the detachable, portable train car braking unit is attached.

2. The detachable, portable train car braking unit of claim 1, wherein determining that the distance of the detachable, portable train car braking unit to the object satisfies a braking criteria comprises:
   determining a non-zero pound-force per square inch (psi) to create in the brake pipe based on the distance of the detachable, portable train car braking unit to the object.

3. The detachable, portable train car braking unit of claim 1, wherein determining that the distance of the detachable, portable train car braking unit to the object satisfies a braking criteria comprises:
  determining a speed of the detachable, portable train car braking unit based on the radar data;
  determining, based on the distance of the detachable, portable train car braking unit to the object and the speed of the detachable, portable train car braking unit, that the detachable, portable train car braking unit will not stop within a coupling distance threshold from the object without hitting the object; and
  based on determining that the detachable, portable train car braking unit will not stop within the coupling distance threshold from the object without hitting the object,
  determining to apply brakes of the train car.

4. The detachable, portable train car braking unit of claim 1, wherein releasing gas from the compressed gas canister through the brake hose coupled to the compressed gas canister and into the brake pipe of the train car applies brakes of the train car to wheels of the train car.

5. The detachable, portable train car braking unit of claim 1, wherein the detachable, portable train car braking unit includes a non-thermographic camera, wherein the storage device stores instructions that are operable, when executed by the processor, to cause the processor to perform operations of:
  obtaining an image from the non-thermographic camera, wherein the object is a second train car, and
  determining the distance of the detachable, portable train car braking unit to the second train car is based on the image and the radar data.

6. The detachable, portable train car braking unit of claim 1, wherein the detachable, portable train car braking unit includes a thermographic camera, wherein the storage device stores instructions that are operable, when executed by the processor, to cause the processor to perform operations of:
  obtaining an infrared image from the thermographic camera,
  wherein the object is a human, and
  determining the distance of the detachable, portable train car braking unit to the human is based on the infrared image and the radar data.

7. The detachable, portable train car braking unit of claim 1, wherein the detachable, portable train car braking unit is detachably attached to the train car.

8. The detachable, portable train car braking unit of claim 7, wherein the detachable, portable train car braking unit is attached to a side of the train car that is closest towards the object.

9. The detachable, portable train car braking unit of claim 7, wherein the housing of the detachable, portable train car braking unit includes a permanent magnet on a side of the detachable, portable train car braking unit that is opposite of the side of the detachable, portable train car braking unit where the radar emitter is positioned, and wherein the detachable, portable train car braking unit is removably attachable to the train car by the permanent magnet.

10. The detachable, portable train car braking unit of claim 1, wherein the detachable, portable train car braking unit includes two handles on two opposing sides of the detachable, portable train car braking unit.

11. A computer-implemented method comprising:
  obtaining radar data from a radar;
  determining, based on the radar data, a distance of a radar emitter of a detachable, portable train car braking unit to an object;
  determining that the distance of the radar emitter of the detachable, portable train car braking unit to the object satisfies a braking criteria; and
  based on determining that the distance of the detachable, portable train car braking unit to the object satisfies the braking criteria, directly controlling a brake of a train car to which the detachable, portable train car braking unit is attached, comprising releasing gas from a compressed gas canister located within a housing of the detachable, portable train car braking unit, through a brake hose that extends out from the housing of the detachable, portable train car braking unit, through a detachable coupler between the brake hose and a brake pipe of the train car to which the detachable, portable train car braking unit is attached, and into the brake pipe of the train car to which the detachable, portable train car braking unit is attached.

12. The method of claim 11, wherein determining that the distance of the detachable, portable train car braking unit to the object satisfies a braking criteria comprises:
  determining a non-zero pound-force per square inch (psi) to create in the brake pipe based on the distance of the detachable, portable train car braking unit to the object.

13. The method of claim 11, wherein determining that the distance of the detachable, portable train car braking unit to the object satisfies a braking criteria comprises:
  determining a speed of the detachable, portable train car braking unit based on the radar data;
  determining, based on the distance of the detachable, portable train car braking unit to the object and the speed of the detachable, portable train car braking unit, that the detachable, portable train car braking unit will not stop within a coupling distance threshold from the object without hitting the object; and
  based on determining that the detachable, portable train car braking unit will not stop within the coupling distance threshold from the object without hitting the object, determining to apply brakes of the train car.

14. The method of claim 11, wherein releasing gas from the compressed gas canister through the brake hose coupled to the compressed gas canister and into the brake pipe of the train car applies brakes of the train car to wheels of the train car.

15. The method of claim 11, comprising:
  obtaining an image from a non-thermographic camera, wherein the object is a second train car, and
  determining the distance of the detachable, portable train car braking unit to the second train car is based on the image and the radar data.

16. The method of claim 11, comprising:
  obtaining an infrared image from a thermographic camera,
  wherein the object is a human, and
  determining the distance of the detachable, portable train car braking unit to the human is based on the infrared image and the radar data.

17. A non-transitory computer-readable medium storing software comprising instructions executable by one or more computers which, upon such execution, cause the one or more computers to perform operations comprising:
  obtaining radar data from a radar;
  determining, based on the radar data, a distance of a radar emitter of a detachable, portable train car braking unit to an object;

determining that the distance of the radar emitter of the detachable, portable train car braking unit to the object satisfies a braking criteria; and based on determining that the distance of the detachable, portable train car braking unit to the object satisfies the braking criteria, directly controlling a brake of a train car to which the detachable, portable train car braking unit is attached, comprising releasing gas from a compressed gas canister located within a housing of the detachable, portable train car braking unit, through a brake hose that extends out from the housing of the detachable, portable train car braking unit, through a detachable coupler between the brake hose and a brake pipe of the train car to which the detachable, portable train car braking unit is attached, and into the brake pipe of the train car to which the detachable, portable train car braking unit is attached.

18. The medium of claim 17, wherein determining that the distance of the detachable, portable train car braking unit to the object satisfies a braking criteria comprises:

determining a non-zero pound-force per square inch (psi) to create in the brake pipe based on the distance of the detachable, portable train car braking unit to the object.

19. The medium of claim 17, wherein determining that the distance of the detachable, portable train car braking unit to the object satisfies a braking criteria comprises:

determining a speed of the detachable, portable train car braking unit based on the radar data;

determining, based on the distance of the detachable, portable train car braking unit to the object and the speed of the detachable, portable train car braking unit, that the detachable, portable train car braking unit will not stop within a coupling distance threshold from the object without hitting the object; and based on determining that the detachable, portable train car braking unit will not stop within the coupling distance threshold from the object without hitting the object, determining to apply brakes of the train car.

20. The medium of claim 17, wherein releasing gas from the compressed gas canister through the brake hose coupled to the compressed gas canister and into the brake pipe of the train car applies brakes of the train car to wheels of the train car.

* * * * *